(12) United States Patent
Zeng et al.

(10) Patent No.: US 11,196,848 B2
(45) Date of Patent: Dec. 7, 2021

(54) TERMINAL DEVICE HAVING ROTATABLE CAMERA ASSEMBLY AND ROTATABLE CAMERA ASSEMBLY OF TERMINAL DEVICE

(71) Applicant: GUANGDONG OPPO MOBILE TELECOMMUNICATIONS CORP., LTD., Guangdong (CN)

(72) Inventors: Zanjian Zeng, Guangdong (CN); Kai Gao, Guangdong (CN); Wuchun Zeng, Guangdong (CN); Xiang Zhang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/889,755

(22) Filed: Jun. 1, 2020

(65) Prior Publication Data
US 2020/0296191 A1     Sep. 17, 2020

Related U.S. Application Data

(63) Continuation of application No. PCT/CN2018/117492, filed on Nov. 26, 2018.

(30) Foreign Application Priority Data

Dec. 28, 2017   (CN) .......................... 201711495633.4

(51) Int. Cl.
*H04M 1/02*    (2006.01)
*H04M 1/03*    (2006.01)
(Continued)

(52) U.S. Cl.
CPC ........ H04M 1/0264 (2013.01); G06F 1/1686 (2013.01); H04M 1/035 (2013.01);
(Continued)

(58) Field of Classification Search
CPC ........... H04M 1/0264; H04M 2250/20; H04M 2250/52; H04M 1/02; H04M 1/026;
(Continued)

(56) References Cited

U.S. PATENT DOCUMENTS 8,224,179 B2 *   7/2012  Lin ........................ G03B 17/02
                                                  396/535
2005/0014527 A1 *  1/2005  Chambers ............ H04N 5/2354
                                                  455/556.1
(Continued)

FOREIGN PATENT DOCUMENTS

CN          1747490       *   3/2006  .......... H04M 1/0264
CN          1747490 A         3/2006
(Continued)

OTHER PUBLICATIONS

International search report,PCT/CN2018/117492, dated Feb. 26, 2019 (2 pages).
(Continued)

*Primary Examiner* — Twyler L Haskins
*Assistant Examiner* — Akshay Trehan
(74) *Attorney, Agent, or Firm* — Young Basile Hanlon & MacFarlane, P.C.

(57) ABSTRACT

Provided are a terminal device and a camera assembly thereof. The camera assembly comprises a fixing support, a camera module, a driving mechanism and an operating mechanism, wherein the camera module is connected to the fixing support in a rotatable manner, the driving mechanism is provided between the camera module and the fixing support and is used for producing a rotation driving force for the camera module relative to the fixing support so as to drive the camera module to rotate, with a side of the camera module as the axis, in such a manner that the opposite side of the camera module rotates away from the fixing support;
(Continued)

and the operating mechanism is fixed on the fixing support and is used for limiting a reset state position of the camera module.

18 Claims, 11 Drawing Sheets

(51) Int. Cl.
*H04N 5/225* (2006.01)
*G06F 1/16* (2006.01)

(52) U.S. Cl.
CPC ......... *H04N 5/2252* (2013.01); *H04N 5/2253* (2013.01); *H04N 5/2254* (2013.01); *H04N 5/2257* (2013.01); *H04M 2250/20* (2013.01)

(58) Field of Classification Search
CPC .. H04M 1/0266; H04M 2250/22; H04M 1/03; H04M 1/035; H04N 5/2251; H04N 5/2252; H04N 5/2253; H04N 5/2254; H04N 5/2257; H04N 5/23293; H04N 5/232933; H04N 5/232935; H04N 5/232939; H04N 5/232941; H04N 5/232945; H04N 5/23216; H04N 1/00384; H04N 1/00397; H04N 1/004; H04N 1/00411; G06F 1/1686; G06F 1/1688; H04R 1/02; H04R 1/00; H04R 2499/11
USPC ........ 348/373–376; 455/575.1; 396/419, 535
See application file for complete search history.

(56) References Cited

U.S. PATENT DOCUMENTS

| | | | |
|---|---|---|---|
| 2005/0060842 A1* | 3/2005 | Ibaraki | H04N 5/2251 16/295 |
| 2007/0013555 A1 | 1/2007 | Sung et al. | |
| 2008/0205874 A1* | 8/2008 | Chen | G03B 17/02 396/419 |
| 2008/0268925 A1 | 10/2008 | Tang | |
| 2008/0316686 A1* | 12/2008 | Yamazato | H04N 5/2257 361/679.01 |
| 2010/0207774 A1* | 8/2010 | Song | H04N 5/23299 340/669 |
| 2014/0133106 A1* | 5/2014 | Lee | H04M 1/03 361/729 |
| 2017/0034319 A1* | 2/2017 | Chenn | H04N 1/00307 |
| 2017/0064166 A1* | 3/2017 | Xiong | H04M 1/0264 |
| 2017/0223158 A1* | 8/2017 | Yin | H04M 1/02 |
| 2017/0339346 A1 | 11/2017 | Chung et al. | |

FOREIGN PATENT DOCUMENTS

| | | | | |
|---|---|---|---|---|
| CN | 103220383 | A | 7/2013 | |
| CN | 203224816 | * | 10/2013 | ............... G06F 1/16 |
| CN | 203224816 | U | 10/2013 | |
| CN | 203368530 | U | 12/2013 | |
| CN | 103595836 | A | 2/2014 | |
| CN | 103754381 | A | 4/2014 | |
| CN | 204216938 | U | 3/2015 | |
| CN | 204216938 | U * | 3/2015 | ............... H04M 1/02 |
| CN | 204334742 | U | 5/2015 | |
| CN | 204408430 | U | 6/2015 | |
| CN | 106254581 | A | 12/2016 | |
| CN | 106254581 | A * | 12/2016 | .......... H04M 1/0264 |
| CN | 106790826 | A | 5/2017 | |
| CN | 106790833 | A | 5/2017 | |
| CN | 107071242 | A | 8/2017 | |
| EP | 1267576 | A2 | 12/2002 | |
| EP | 1727356 | A2 * | 11/2006 | ........... H04N 5/2259 |

OTHER PUBLICATIONS

First Office Action from China patent office in a counterpart Chinese patent Application 201711495633.4, dated Apr. 22, 2020 (10 pages).
Notification to Grant Patent Right for Invention with English Translation of Chinese Application No. 201711495633.4, dated Nov. 17, 2020 (6 pages).
European search report,European Application No. 18894367.4 , dated Nov. 27, 2020 (10 pages).
Indian First Examination Report for IN Application 202017023399 dated Mar. 12, 2021. (5 pages).
Chinese Second Office Action, Chinese Application No. 201711495633.4 , dated Aug. 12, 2020 (17 pages).

* cited by examiner

TERMINAL DEVICE HAVING ROTATABLE CAMERA ASSEMBLY AND ROTATABLE CAMERA ASSEMBLY OF TERMINAL DEVICE

CROSS-REFERENCE TO RELATED APPLICATION(S)

This application is a continuation application of International (PCT) Patent Application No. PCT/CN2018/117492, filed on Nov. 26, 2018, which claims priority to Chinese Patent Application No. 201711495633.4, filed on Dec. 28, 2017, the contents of both of which are herein incorporated by reference in their entireties.

TECHNICAL FIELD

The described embodiments relates to the field of terminal devices, and in particular, to a terminal device and a camera assembly thereof.

BACKGROUND

At present, camera functions are indispensable to terminal devices such as mobile phones. Front cameras are also required by many people, since the front cameras can meet the needs of selfies and video calls. However, with the popularization of full screens of the mobile phones, there is no room for arranging the front cameras at sides at which the screens are located any longer.

SUMMARY

In some aspects of the present disclosure, a rotatory camera assembly for a terminal device may be provided. The camera assembly may include: a fixing bracket, a camera module, a driving mechanism, and an operating mechanism. The camera module is rotatably connected to the fixing bracket and has a reset state in which the camera module is received in the fixing bracket. The driving mechanism is disposed between the camera module and the fixing bracket and configured to drive the camera module to rotate relative to the fixing bracket to drive the camera module to rotate about a side edge of the camera module, such that an opposite side edge of the camera module is capable of rotating away from the fixing bracket and the camera module is ejected out of the fixing bracket. The operating mechanism is arranged on the fixing bracket and configured to control a position of the camera module.

In some aspects of the present disclosure, a terminal device may be further provided. The terminal device may include: a display screen, a processor; and a camera assembly. The camera assembly may include: a fixing bracket, a camera module, a driving mechanism, and an operating mechanism. The camera module is rotatably connected to the fixing bracket and has a reset state in which the camera module is received in the fixing bracket and an ejecting state in which the camera module is located out of the fixing bracket. The driving mechanism is disposed between the camera module and the fixing bracket and configured to drive the camera module to rotate relative to the fixing bracket and further drive the camera module to rotate about a side edge of the camera module, such that an opposite side edge of the camera module is capable of rotating away from or close to the fixing bracket and that the camera module is switchable between the ejecting state and the reset state. The operating mechanism is arranged on the fixing bracket and configured to control a position of the camera module. The processor is configured to receive a control instruction of the display screen and control the camera module in the camera assembly to shoot according to the control instruction.

Furthermore, in some aspects of the present disclosure, a terminal device may be further provided. The terminal device may include: a housing, a camera module, a driving mechanism, and an operating mechanism. The camera module is rotatably connected to the housing and has a first position in which the camera module is in the housing and a second position in which the camera module is out of the housing. The driving mechanism is disposed between the camera module and the housing and configured to drive the camera module to rotate relative to the housing and further drive the camera module to rotate about a side edge of the camera module, such that an opposite side edge of the camera module is capable of rotating away from or close to the housing and that the camera module is movable between the first position and the second position. The operating mechanism is arranged on the housing and configured to control a position of the camera module.

BRIEF DESCRIPTION OF DRAWINGS

In order to describe the technical solutions in the embodiments of the present disclosure more clearly, the drawings required to be used in descriptions of the embodiments will be briefly described below. Obviously, the drawings described below are only some embodiments of the present disclosure, and those skilled in the art may obtain other drawings according to the drawings without creative efforts.

DETAILED DESCRIPTION

Figure 1:
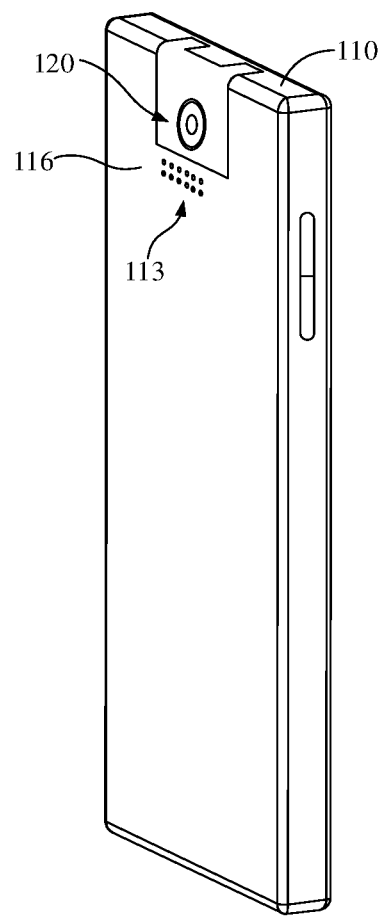
FIG. 1 is a schematic view illustrating an overall structure of a terminal device in which a rotary camera assembly is in a full-reset state according to some embodiments of the present disclosure.

The technical solutions in some embodiments of the present disclosure will be described clearly and completely in conjunction with the drawings in some embodiments of the present disclosure. Apparently, the described embodiments are only a part of the embodiments of the present disclosure, not all the embodiments. Based on the embodiments of the present disclosure, those skilled in the art may acquire other embodiments without making creative efforts. All these embodiments fall within the protection scope of the present disclosure.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

In some aspects of the present disclosure, a rotatory camera assembly for a terminal device may be provided. The camera assembly may include: a fixing bracket, a camera module, a driving mechanism, and an operating mechanism. The camera module is rotatably connected to the fixing bracket and has a reset state in which the camera module is received in the fixing bracket. The driving mechanism is disposed between the camera module and the fixing bracket and configured to drive the camera module to rotate relative to the fixing bracket to drive the camera module to rotate about a side edge of the camera module, such that an opposite side edge of the camera module is capable of rotating away from the fixing bracket and the camera module is ejected out of the fixing bracket. The operating mechanism is arranged on the fixing bracket and configured to control a position of the camera module.

In some embodiments, the camera module may include a body and a camera unit disposed inside the body, and the body is hinged to the fixing bracket through a rotating shaft.

In some embodiments, the driving mechanism is a torsion spring, and the torsion spring is sleeved on the rotating shaft, and one end of a torsion force generated by the torsion spring abuts against the body and the other end of the torsion force abuts against the fixing bracket, and the torsion spring is configured to continuously drive the camera module to rotate relative to the fixing bracket.

In some embodiments, the fixing bracket defines a receiving groove.

When the camera module is in the reset state, the camera module is completely received in the receiving groove without protruding out of an outer surface of the fixing bracket.

In some embodiments, the fixing bracket defines an engaging groove on a side wall adjacent to the receiving groove, and an engaging protrusion is disposed at an outer side of the body and capable of being engaged with the engaging groove; when the camera module in the reset state, the engaging protrusion is engaged with the engaging groove.

In some embodiments, the operating mechanism may include: an operating key, wherein one end of the operating key protrudes out of the outer surface of the fixing bracket, and the other end of the operating key is connected to the operating link; and an operating link, wherein the operating link is movable relative to the fixing bracket and has an end portion capable of abutting against the engaging protrusion when the engaging protrusion is engaged in the engaging groove, such that the engaging protrusion is capable of being disengaged from the engaging groove and the camera module is driven to rotate and being ejected when driven by the driving mechanism.

In some embodiments, an operating protrusion is further disposed on a side surface of the operating link, and the operating link is capable of abutting against the engaging protrusion through the operating protrusion; a movement direction of the operating link is perpendicular to a direction of a force applied by the operating link to abut against the engaging protrusion.

In some embodiments, the operating link may include a first connecting rod and a second connecting rod. One end of the first connecting rod is connected to the operating key, the other end of the first connecting rod is hinged to one end of the second connecting rod, and a middle portion of the second connecting rod is hinged to the fixing bracket via a hinge point. The second connecting rod is rotatable about the hinge point, and the other end of the second connecting rod is capable of rotating into the engaging groove and further abutting against the engaging protrusion located in the engaging groove.

In some aspects of the present disclosure, a terminal device may be further provided. The terminal device may include: a display screen, a processor; and a camera assembly. The camera assembly may include: a fixing bracket, a camera module, a driving mechanism, and an operating mechanism. The camera module is rotatably connected to the fixing bracket and has a reset state in which the camera module is received in the fixing bracket and an ejecting state in which the camera module is located out of the fixing bracket. The driving mechanism is disposed between the camera module and the fixing bracket and configured to drive the camera module to rotate relative to the fixing bracket and further drive the camera module to rotate about a side edge of the camera module, such that an opposite side edge of the camera module is capable of rotating away from or close to the fixing bracket and that the camera module is switchable between the ejecting state and the reset state. The operating mechanism is arranged on the fixing bracket and configured to control a position of the camera module. The processor is configured to receive a control instruction of the display screen and control the camera module in the camera assembly to shoot according to the control instruction.

In some embodiments, the control instruction of the display screen may include at least one of sliding, clicking, and long-pressing.

In some embodiments, the terminal device may include a controlling button, and the control instruction further may include a trigger instruction of the controlling button.

In some embodiments, the control instruction may include at least one of an image acquisition requirement, a flash activation requirement, and a speaker activation requirement.

In some aspects of the present disclosure, a terminal device may be further provided. The terminal device may include: a housing, a camera module, a driving mechanism, and an operating mechanism. The camera module is rotatably connected to the housing and has a first position in which the camera module is in the housing and a second position in which the camera module is out of the housing. The driving mechanism is disposed between the camera module and the housing and configured to drive the camera module to rotate relative to the housing and further drive the camera module to rotate about a side edge of the camera module, such that an opposite side edge of the camera module is capable of rotating away from or close to the housing and that the camera module is movable between the first position and the second position. The operating mechanism is arranged on the housing and configured to control a position of the camera module.

In some embodiments, the housing defines a receiving groove configured to receive the camera module when the camera module in the first position.

The camera module may include a body and a camera unit disposed inside the body, and the body is hinged to the housing through a rotating shaft.

In some embodiments, the driving mechanism is a torsion spring, and the torsion spring is sleeved on the rotating shaft, and one end of a torsion force generated by the torsion spring abuts against the body and the other end of the torsion force abuts against the housing, and the torsion spring is configured to continuously drive the camera module to rotate relative to the housing.

When the camera module is in the reset state, the camera module is completely received in the receiving groove without protruding out of an outer surface of the fixing bracket.

In some embodiments, the housing defines an engaging groove on a side wall adjacent to the receiving groove, and an engaging protrusion is disposed at an outer side of the body and capable of being engaged with the engaging groove; when the camera module in the first position, the engaging protrusion is engaged with the engaging groove.

In some embodiments, the operating mechanism may include: an operating key, wherein one end of the operating key protrudes out of an outer surface of the housing, and the other end of the operating key is connected to the operating link; and an operating link, wherein the operating link is movable and has an end portion capable of abutting against the engaging protrusion when the engaging protrusion is engaged in the engaging groove, such that the engaging protrusion is capable of being disengaged from the engaging groove and the camera module is driven to rotate and being ejected when driven by the driving mechanism.

In some embodiments, an operating protrusion is further disposed on a side surface of the operating link, and the operating link is capable of abutting against the engaging protrusion through the operating protrusion; a movement direction of the operating link is perpendicular to a direction of a force applied by the operating link to abut against the engaging protrusion.

In some embodiments, the operating link may include a first connecting rod and a second connecting rod. One end of the first connecting rod is connected to the operating key, the other end of the first connecting rod is hinged to one end of the second connecting rod, and a middle portion of the second connecting rod is hinged to the housing via a hinge point; the second connecting rod is rotatable about the hinge point, and the other end of the second connecting rod rotates into the engaging groove and further abuts against the engaging protrusion located in the engaging groove.

In some embodiments, the terminal device further comprises a display screen, the display screen has a display region, and a projection of the camera module projected on the display screen is at least partially disposed within the display area when the camera module is in the first position.

Figure 2:
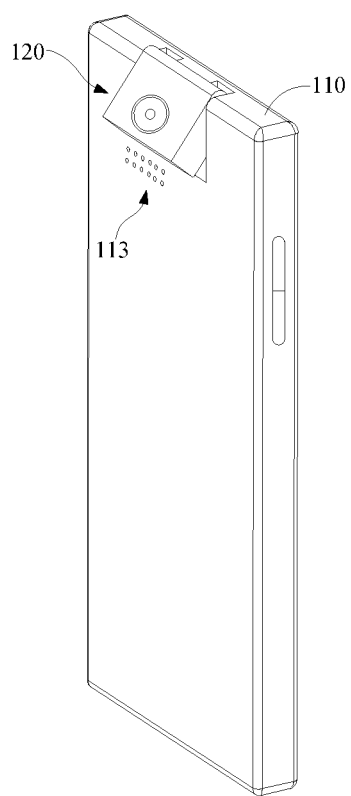
FIG. 2 is a schematic structural view of the terminal device shown in FIG. 1 in which the rotary camera assembly is in a semi-ejecting state according to some embodiments of the present disclosure.
Figure 3:
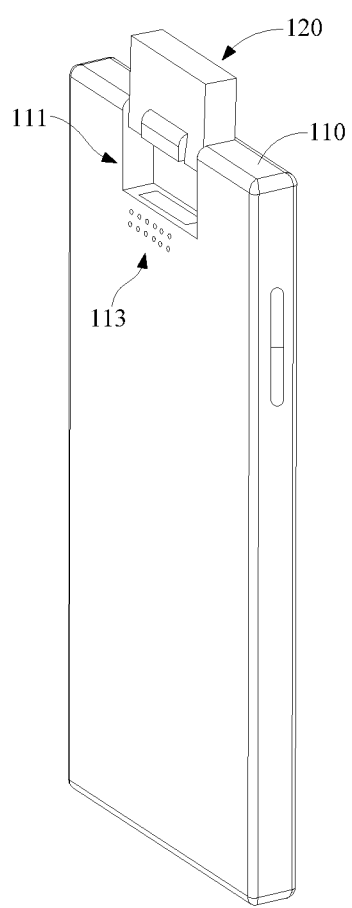
FIG. 3 is a schematic structural view of the terminal device shown in FIG. 1 in which the rotary camera assembly is in a full-ejecting state.

As shown in FIG. 1 to FIG. 3, FIG. 1 is a schematic view illustrating an overall structure of a terminal device in which a rotary camera assembly is in a full-reset state according to some embodiments of the present disclosure, FIG. 2 is a schematic structural view of the terminal device shown in FIG. 1 in which the rotary camera assembly is in a semi-ejecting state according to some embodiments of the present disclosure, and FIG. 3 is a schematic structural view of the terminal device shown in FIG. 1 in which the rotary camera assembly is in a full-ejecting state. It should be noted that the terminal device in some embodiments of the present disclosure may include an electronic device equipped with a camera assembly, such as a mobile phone, a tablet computer, a laptop computer, a wearable device, and the like.

Figure 4:
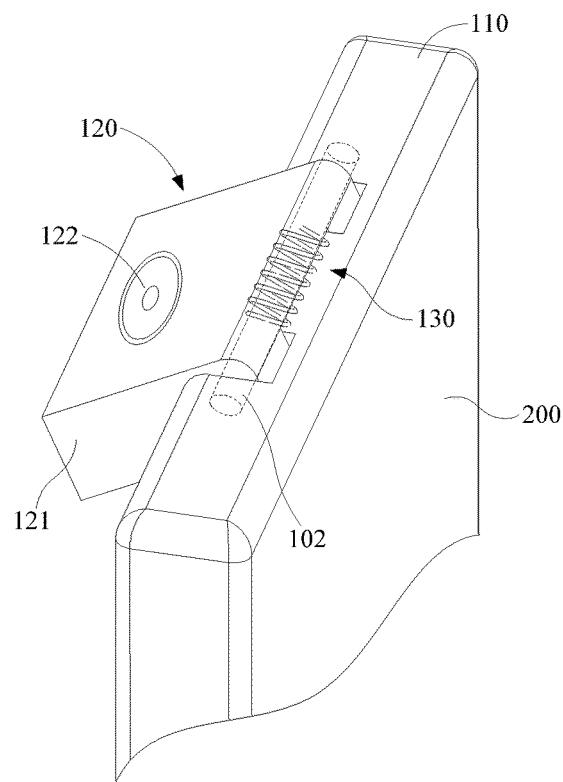
FIG. 4 is a partial view of the terminal device shown in FIG. 1 according to some embodiments of the present disclosure.
Figure 5:
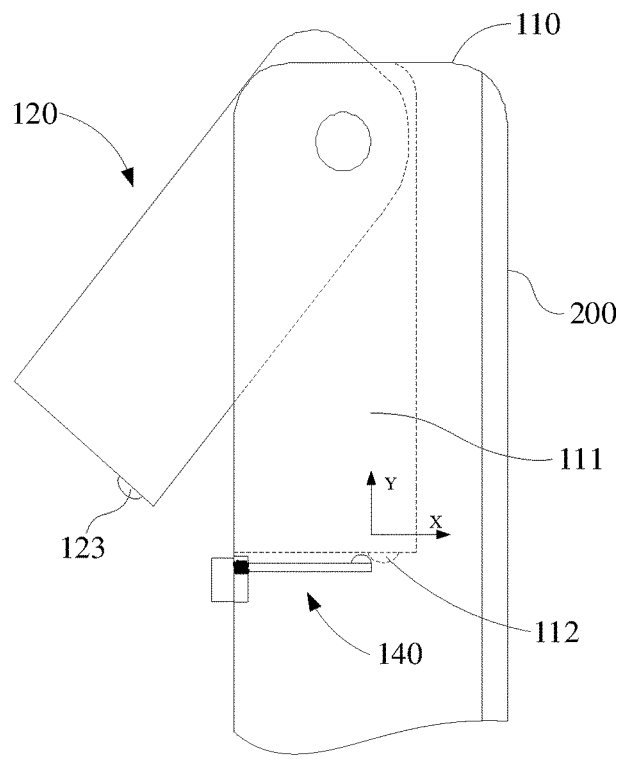
FIG. 5 is a partial side view of the terminal device as shown in FIG. 4.

The terminal device may include a housing 110, a camera module 120, a driving mechanism 130, an operating mechanism 140, and a display screen 200 (detailed structural features of the driving mechanism 130, the operating mechanism 140, and the display screen 200 may refer to FIGS. 4-5, and subsequent related description), and the like. Of course, the terminal device should also include components that are arranged inside the housing 110, such as a circuit board, a battery, a sensor, and the like. The circuit board may be configured to control actions of the terminal device, such as display, photographing, and the like. The battery may be configured to supply power to the terminal device. The camera module 120 in some embodiments of the present disclosure should also be connected to the circuit board, such that the circuit board may control the photographing performed by the camera module 120 and further acquire the captured image information. Of course, the display screen and the like should also be connected to the circuit board. As to the detailed structural connection and data parameters of this part, on one hand, since these features are located in the housing 110 and invisible in the figures, on the other hand, these technical features (circuit board, battery, sensor, and the like) do not relate to the innovation of the technical solution of the present disclosure, thus these features will not be described in detail here. Furthermore, the terms "including" and "having", and any modification thereof are intended to cover un-exclusive inclusion. For example, a process, method, system, product, or device that may include a series of steps or units is not limited to the listed steps or units, but optionally also may include steps or units not listed, or optionally may include other steps or units inherent to these processes, methods, products, or equipment.

In some embodiments of the present disclosure, FIGS. 1-3 respectively show a full-reset state, a semi-ejecting state, and a full-ejecting state of the camera module 120 of the terminal device. Herein, the term "full-reset state" means that the camera module 120 is completely or fully received in the housing 110 without protruding out of an outer surface 116 of the housing 110, or in some case an outer surface of the camera module 120 may be at the same level or flush with the outer surface of the housing 110. The term "semi-ejecting" means that, the camera module 120 is ejected or rotated out of the housing 110 with a half portion of the camera module 120 still being received in the housing 110. The term "full-ejecting" means that, the camera module 120 is completely ejected or rotated out of the housing 110. In some embodiments as shown in FIGS. 1-3, the numeral 113 may refer to a sound hole, the numeral 111 may refer to a receiving groove. The detailed introduction of the sound hole 113 and the receiving groove 111 will be described in detail later in conjunction with the structures of the camera module 120, the driving mechanism 130, and the operating mechanism 140.

As shown in FIGS. 4-5, FIG. 4 is a partial view of the terminal device shown in FIG. 1 according to some embodiments of the present disclosure, and FIG. 5 is a partial side view of the terminal device as shown in FIG. 4. The camera assembly for the terminal device may include a fixing bracket 110, the camera module 120, the driving mechanism 130, and the operating mechanism 140.

In some embodiments, the camera module 120 may be rotatably connected to the fixing bracket 110. More specifically, the camera module 120 may have a reset state in which the camera module 120 is received in the fixing bracket 110 and an ejecting state in which the camera module 120 is located out of the fixing bracket 110. Or, the camera module 120 may have a first portion in which the camera module 120 is received in the fixing bracket 110 and a second portion in which the camera module 120 is located out of the fixing bracket 110. The driving mechanism 130 may be disposed between the camera module 120 and the fixing bracket 110, and configured to generate a driving force for the rotation of the camera module 120 relative to the fixing bracket 110, drive the camera module 120 to rotate about an axis (using a side edge of the camera module 120 as the axis), such that an opposite side edge of the camera module 120 may rotate away from or close to the fixing bracket 110, and that the camera module 120 is switchable between the ejecting state and the reset state. When the opposite side edge of the camera module 120 rotates away from the fixing bracket 110, the camera module 120 may face toward a front side of the display screen 200 of the terminal device and further perform the photographing. The operating mechanism 140 may be arranged or even fixed on the fixing bracket 110 and configured to define or limit a position of the camera module 120 when the camera module 120 is in the reset state.

More specifically, in some embodiments, the fixing bracket 110 is the housing of the terminal device. More specifically, the housing may include a rear shell and a side frame of the terminal device. The housing may define a receiving groove 111 (as further shown in FIG. 3). The receiving groove 111 may be configured to receive the camera module 120 in the reset state. In some embodiments, the camera module 120 may be completely or fully received in the receiving groove 111 when the camera module 120 is in the reset state, and will not protrude out of an outer surface 116 of the housing of the terminal device. That is to say, an outer surface of the camera module 120 may be substantially at the same level or flush with the outer surface 116 of the housing or fixing bracket 110, or lower than the outer surface 116 of the housing or fixing bracket 110. In this way, the outer surface 116 of the housing of the terminal device may be even, and an overall structure of the terminal device may be more aesthetic. As further shown in FIG. 1 and FIG. 5, in some embodiments, FIG. 1 is a schematic view illustrating that the camera module 120 is in the full-reset state.

The camera module 120 may include a body 121 and a camera unit 122 disposed or embedded in the body 121. The specific structural features of the camera unit 122 are within the understanding scope of those skilled in the art and will not be described in detail here. Further, the camera module in some embodiments of the present disclosure may be a single camera, or may include dual cameras, a plurality of cameras, or may include a camera, a flash, a sensor, and the like, which are packed together. In some embodiments, the body 121 may be hinged to the fixing bracket 110 through a rotating shaft 102 (a long axis in the broken line shown in FIG. 4).

In some embodiments, the driving mechanism 130 may be implemented as a torsion spring. In some embodiments, the torsion spring may be sleeved on the rotating shaft 102 through which the body 121 is hinged to the fixing bracket 110. Both ends of the torsion force generated by the torsion spring may abut against the body 121 and the fixing bracket 110, respectively. That is, one end of the torsion force generated by the torsion spring abuts against the body 121 and the other end of the torsion force abuts against the fixing bracket 110. The torsion spring may be configured to generate a continuous driving force to drive the camera module 120 to rotate relative to the fixing bracket 110, that is to say, the camera module 120 may be continuously driven to rotate relative to the fixing bracket 110.

As further shown in FIG. 5, the housing (the fixing bracket 110) of the terminal device may define an engaging groove or slot 112 on a side wall near or adjacent to or close to the receiving groove 111. An engaging protrusion 123 may be further disposed at an outer side of the body 121 of the camera module 120 and capable of being engaged with the engaging groove 112. When the camera module 120 is in the reset state, the engaging protrusion 123 may be engaged with the engaging groove 112 in order to realize the positioning of the camera module 120. The broken line in FIG. 5 shows a structure of the receiving groove 111 inside the housing (the fixing bracket 110) of the terminal device, and the overall structure in FIG. 5 illustrates a schematic view of the camera assembly in the semi-ejecting state.

Figure 6:
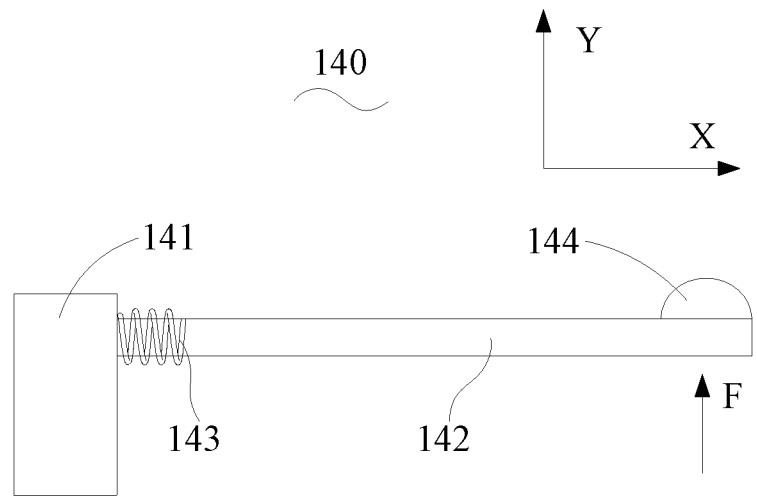
FIG. 6 is a schematic structural view of an operating mechanism according to some embodiments shown in FIG. 5.

As shown in FIG. 5 and FIG. 6, FIG. 6 is a schematic structural view of an operating mechanism according to some embodiments shown in FIG. 5. In some embodiments, the operating mechanism 140 may include an operating key 141 and an operating link 142, and the operating link 142 may be movable relative to the housing or fixing bracket 110. One end of the operating key 141 may protrude out of the outer surface 116 of the housing (the fixing bracket 110) of the terminal device, and the other end of the operating key 141 may be connected to the operating link 142. An end portion of the operating link 142 may be capable of abutting against the engaging protrusion 123 when the engaging protrusion 123 is engaged in the engaging groove 112, such that the engaging protrusion 123 may be capable of disengaged from the engaging groove 112, and the camera module 120 is driven to rotate and be ejected by the driving force of the driving mechanism 130. In some embodiments, the operating key 141 may abut against the housing (the fixing bracket 110) of the terminal device through a spring 143, in order to generate an elastic reset force applied to the operating key 141.

Furthermore, as shown in FIG. 6, an operating protrusion 144 may be further disposed on a side surface of the operating link 142 that cooperates or engages with the engaging protrusion 123, and the operating link 142 may be capable of abutting against the engaging protrusion 123 through the operating protrusion 144. In some embodiments, a cross section of the operating protrusion 144 may be in shape of an arc, a triangle, a rectangle, and the like. In some embodiments, a movement direction of the operating link 142 may be substantially perpendicular to a direction of a force applied by the operating link 142 to abut against the engaging protrusion 123. That is, an X direction in the FIG. 6 is the moving direction of the operating link 142, and a Y direction is the direction of the force applied by the operating link 142 to abut against the engaging protrusion 123. The operating mechanism in this case may have a simple structure. However, the abutting force may be required at a rear side of the operating protrusion 144. The abutting force may help the operating protrusion 144 to provide an acting force to the engaging protrusion 123, or the operating link 142 needs to move within a sliding groove (not shown).

Figure 7:
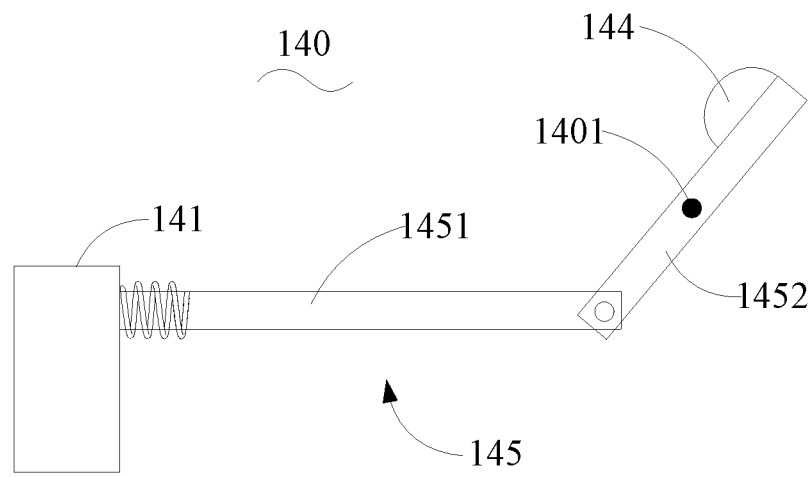
FIG. 7 is a schematic structural view of an operating mechanism according to some embodiments of the present disclosure.

As shown in FIG. 7, FIG. 7 is a schematic structural view of an operating mechanism according to some embodiments of the present disclosure. In some embodiments, the operating mechanism may include the operating key 141 and the operating link 145. More specifically, the operating link 145 may include a first connecting rod 1451 and a second connecting rod 1452. One end of the first connecting rod 1451 may be connected to the operating key 141, the other end of the first connecting rod 1451 may be hinged to one end of the second connecting rod 1452, and a middle portion or a center of the second connecting rod 1452 may be hinged to the housing (the fixing bracket 110) of the terminal device via a hinge point 1401. It should be noted that, terms such as "first", "second", "third", and the like, are used herein for purposes of description, and are not intended to indicate or imply relative importance or significance or to imply the number of indicated technical features. Thus, the feature defined with "first", "second", "third", and the like may include one or more of such a feature. In the description of the present disclosure, it should be noted that, "a plurality of" means two or more, unless specified otherwise.

Figure 8:
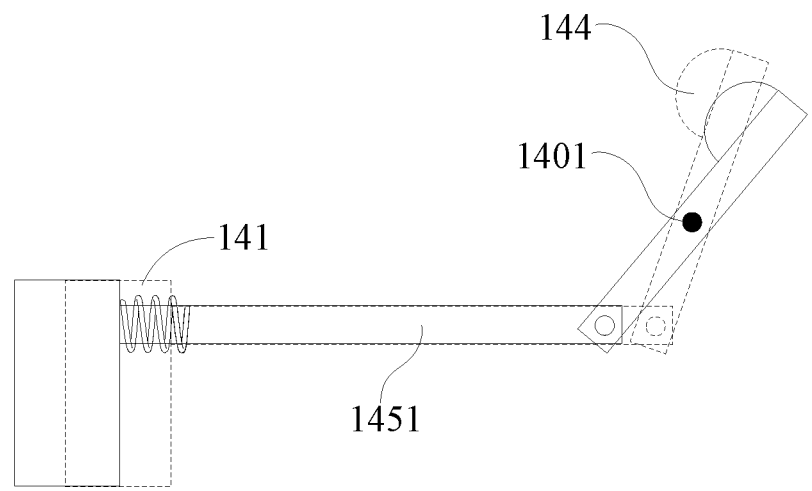
FIG. 8 is a dynamic view illustrating a position changing of the operating mechanism shown in FIG. 7.

Driven by the first connecting rod 1451, the second connecting rod 1452 is rotatable about the hinge point 1401 which is hinged to the housing (the fixing bracket 110) of the terminal device, and the other end of the second connecting rod 1452 may be capable of rotating into the engaging groove 112 (as shown in FIG. 5), and further abutting against the engaging protrusion 123 located in the engaging groove 112, such that the engaging protrusion 123 may be capable of being disengaged from the engaging groove 112. Furthermore, the camera module 120 may be rotated and ejected by the driving force of the driving mechanism 130. FIG. 8 is a dynamic view illustrating a position changing of the operating mechanism shown in FIG. 7. As shown in FIG. 8, the solid line and the broken line indicate the two positions or states of the operating mechanism.

Similarly, the operating protrusion 144 may be further disposed on a side surface of the second connecting rod 1452 that cooperates or engaging with the engaging protrusion 123, and the operating key 141 may abut against the housing (the fixing bracket 110) of the terminal device through the spring 143 to generate an elastic reset force for the resetting of the operating key 141. Compared with the operating mechanism shown in FIG. 6, the operating mechanism shown in FIG. 7 may have a more complex structure. However, as shown in FIG. 7, the abutting force applied by the operating protrusion 144 on the second connecting rod 1452 to the engaging protrusion 123 may be generated via the hinge point 1401. Thus, the housing (the fixing bracket 110) of the terminal device may have less requirements to the constraint conditions to the operating link 145, and the corresponding structures may also be simpler. Details of this structure may be understood by those skilled in the art, and will not be descried in details any more.

Figure 9:
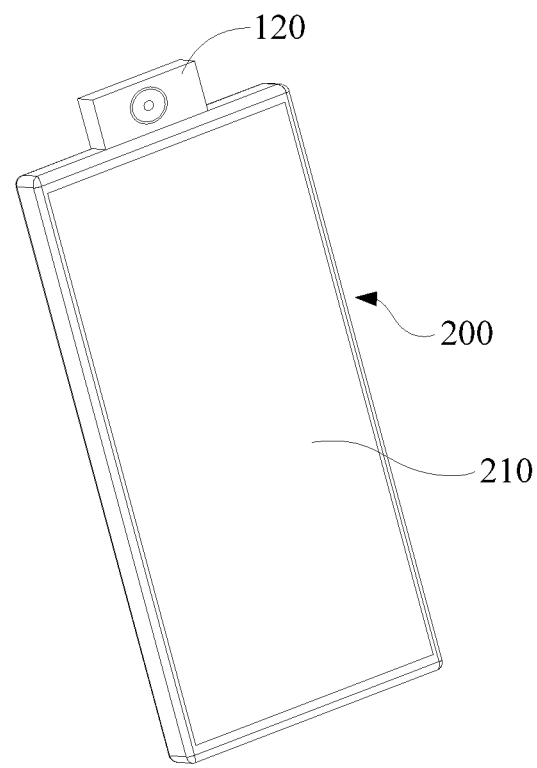
FIG. 9 is a view illustrating a front side of the terminal device shown in FIG. 3.

In some embodiments, when the camera module 120 is in the reset state, the camera module 120 of the camera assembly may be at least partially stacked with the display screen 200. As shown in FIG. 9, FIG. 9 is a view illustrating a front side of the terminal device shown in FIG. 3. As shown in FIG. 9, the display screen 200 may be a full screen, that is, all of the front side of the terminal device belongs to a display region 210 of the display screen (or, a screen ratio of the display region 210 of the display screen 200 is greater than a certain ratio, for example, the screen ratio may exceed 80%, and the like). Therefore, in some embodiments, when the camera module 120 of the camera assembly is in the reset state, the camera module 120 is completely stacked with the display region 210 of the display screen 200, that is, the camera module 120 may be completely disposed below the display region 210 of the display screen 200 when the camera module 120 is in the reset state (as shown in FIG. 1), or a projection of the camera module 120 on the display screen 200 may be completely disposed within the display region 210.

Figure 10:
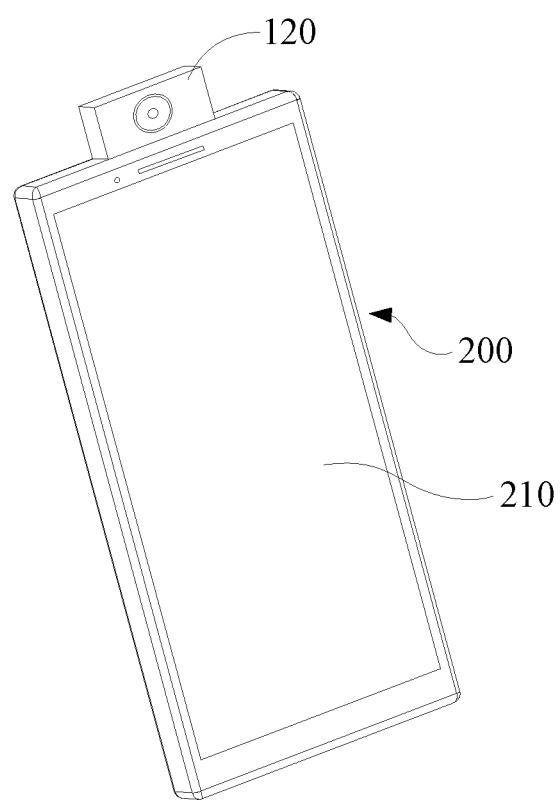
FIG. 10 is a view illustrating a front side of the terminal device according to some embodiments of the present disclosure.

Furthermore, as shown in FIG. 10, FIG. 10 is a view illustrating a front side of the terminal device according to some embodiments of the present disclosure. Compared with the terminal device described in the previous embodiment, in some embodiments as shown in FIG. 10, the display screen 200 may have a smaller screen ratio. In this case, when the camera module 120 is in the reset state, the camera module 120 of the camera assembly may be partially (that is, a part of the structure) stacked with the display region 210 of the display screen 200. That is to say, when the camera module 120 is in the reset state, a part of the camera module 120 may be disposed below the display region 210 of the display screen 200, or a projection of the camera module 120 on the display screen 200 may be partially disposed within the display region 210.

In the terminal device with a rotary camera assembly according to some embodiments of the present disclosure, the camera assembly utilizes the driving mechanism to drive the camera module to rotate, such that the camera module may face towards a front side of the display screen and perform the photographing when needed, that is, the rear camera may realize the function of the front camera. When the camera is not needed, the camera module may be hidden inside the housing of the terminal device. The camera assembly in some embodiments of the present disclosure may have a simple structure, may be convenient to operate, and may not occupy the front space of the terminal device, which may provide a possibility for a full-screen terminal device.

As further shown in FIG. 1, FIG. 2, FIG. 3 and FIG. 11, FIG. 11 is a view illustrating a rear side of the terminal device shown in FIG. 1, the terminal device may further include a speaker unit 300. The frame in the broken line in FIG. 11 may indicate that the speaker unit 300 is disposed inside the rear shell of the terminal device (the fixing bracket 110 in the above embodiment). The rear shell may further define the receiving groove 111 configured to receive the camera module 120. The speaker unit 300 may further define the sound hole 113 at a position adjacent to the receiving groove 111. The sound hole 113 and the receiving groove 111 may communicate with each other inside the rear shell.

The camera module 120 may be rotatable relative to the rear shell (the fixing bracket 110). When the camera module 120 rotates to a state in which the camera module 120 at least partially moves or rotates out of the receiving groove 111 (in FIG. 2, the camera module 120 is rotated to partially eject or move out of the receiving groove 111; in FIG. 3, the camera module 120 is completely rotated, ejected, or moved out of the receiving groove 111, or may the camera module 120 is rotated to be in a working position state or a maximum position state). The receiving groove 111 and the sound hole 113 may together serve as the sound channel of the speaker unit 300. All the directional indicator (such as up, down, left, right, front, rear . . . ) in embodiments of the present disclosure are only used for explaining relative positions, the movements, and the like between components in a specific posture (as shown in the drawings). If the specific posture changes, the directional indicators may change accordingly.

Figure 11:
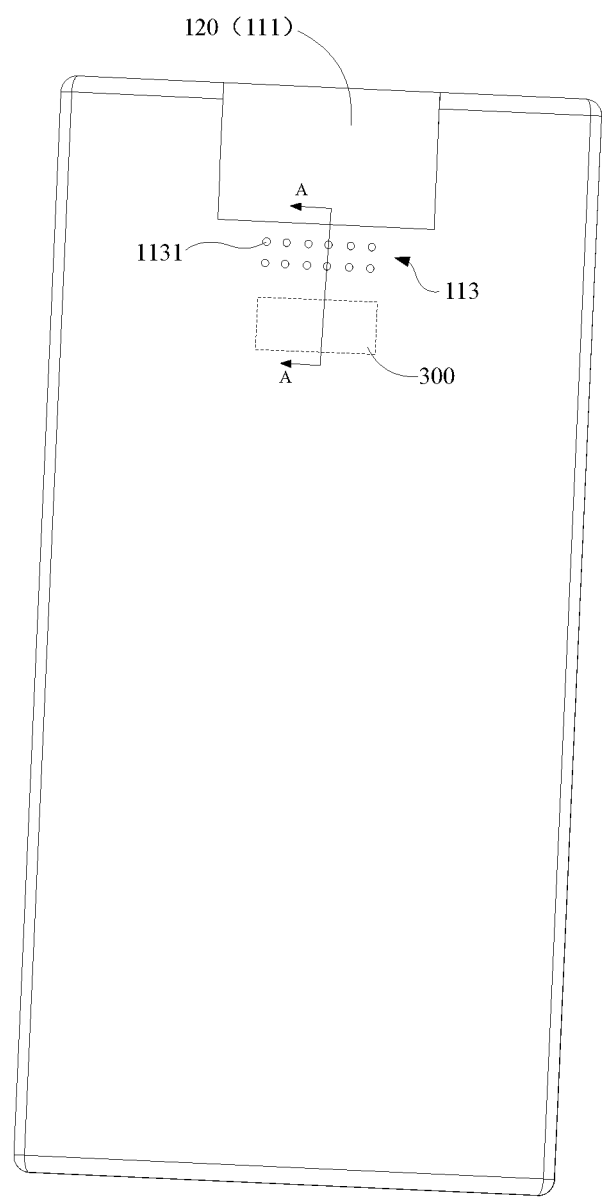
FIG. 11 is a view illustrating a rear side of the terminal device shown in FIG. 1.

In some embodiments, the sound hole 113 may include a plurality of sub-sound holes 1131 arranged in an array. The plurality of sub-sound holes 1131 arranged in an array may be all adjacent to the same side of the receiving groove 111 (in some embodiments as shown in FIG. 11, this side may be a bottom side; however, in other embodiments, the side may also be a left side, a right side, and the like), and may be located between the receiving groove 111 and the speaker unit 300. In the drawings, the receiving groove 111 may be rectangular. However, in some other embodiments, the receiving groove may be irregular shapes or in other shapes. The purpose of this embodiment is to design the plurality of sub-sound holes 1131 of the sound hole 113 in an array or gather together.

Similarly, as further shown in FIGS. 9-11, in some embodiments, the speaker unit 300 may be at least partially stacked with the display screen 200 of the terminal device, or stacked with the display region 210 of the display screen 200. That is to say, a projection of the speaker unit 300 projected on the display screen 200 may be at least partially disposed within the display region 210.

Figure 12:
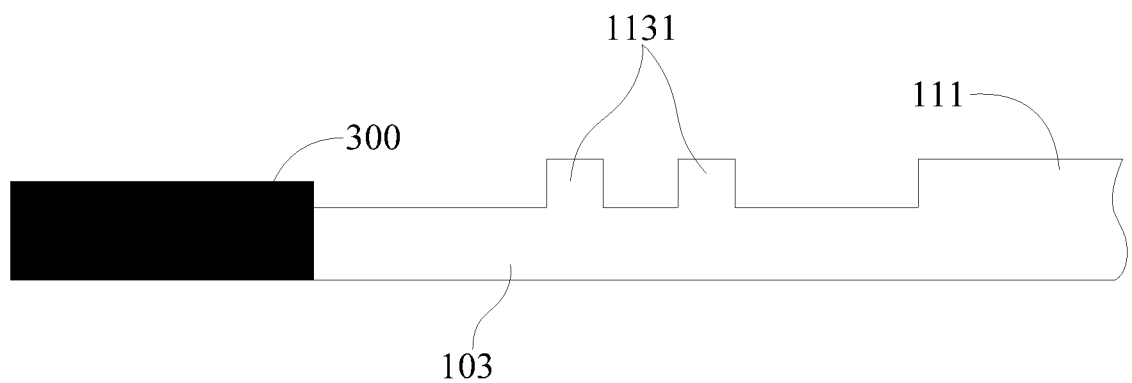
FIG. 12 is a cross-sectional view of FIG. 11 taken along the line A-A.
Figure 13:
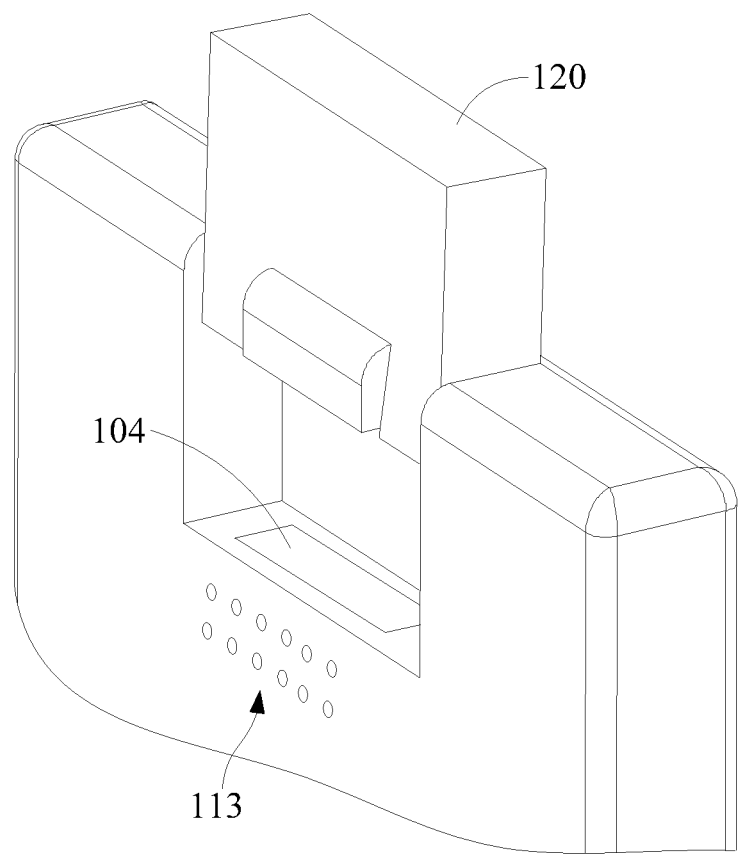
FIG. 13 is a schematic view of a terminal device in which a camera module is partially ejected.

As shown in FIG. 12 and FIG. 13, FIG. 12 is a cross-sectional view of FIG. 11 taken along the line A-A, and FIG. 13 is a schematic view of a terminal device in which a camera module is partially ejected. The sound hole 113 may communicate with the receiving groove 111 via a sound channel 103. A dust screen (not shown) may be disposed at a port 104 at which the sound channel 103 communicates with the receiving groove 111. The dust screen may be configured to reduce the possibility that dusts and other debris enter the sound channel 103 from the port 104 and affects the performance of the speaker unit 300.

Figure 14:
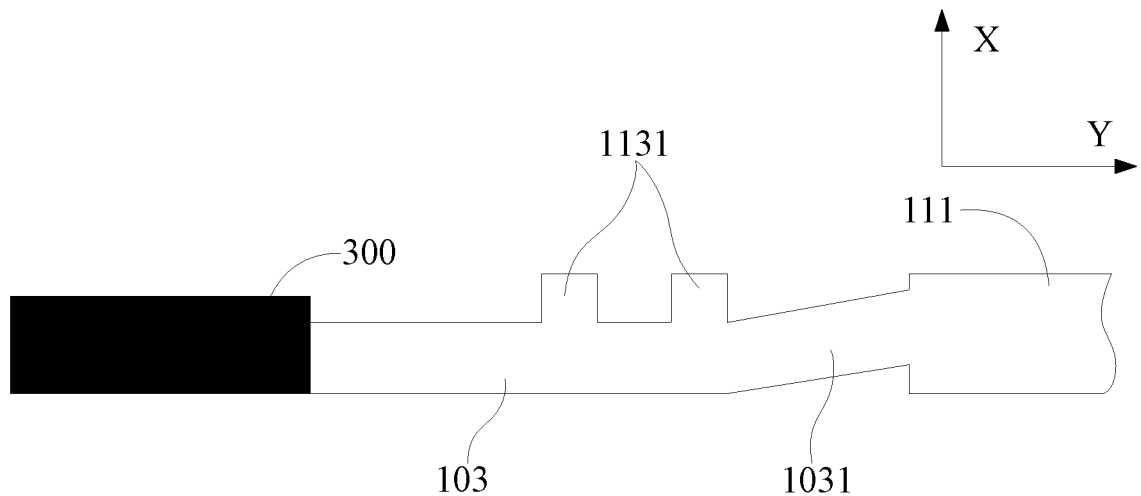
FIG. 14 is a schematic view of a sound channel according to according to some embodiments of the present disclosure.

Furthermore, as shown in FIG. 14, FIG. 14 is a schematic view of a sound channel according to according to some embodiments of the present disclosure. Unlike the sound channel descried in the previous embodiments, in some embodiments, a section of the sound channel 1031 between the sound hole 113 and the receiving groove 111 may extend toward a sound output side (along the X direction in FIG. 14). The sound channel of this inclined structure can make the sound output smoother and facilitate the sound to output from the receiving groove 111. Similarly, another dust screen (not shown) may be further provided at the port at which the sound channel 1031 communicates with the receiving groove 111.

In addition, in other embodiments, the sound hole 113 and the receiving groove 111 may both communicate with an inner cavity of the rear shell (the fixing bracket 110 in the foregoing embodiments) of the terminal device. At least a part of the inner cavity of the rear shell of the terminal device may serve as the sound channel of the sound hole 113 and the receiving groove 111, that is, it is possible not to separately design the sound channel, but the inner cavity formed by the rear shell of the terminal device may be utilized as the sound channel, which can make the internal structure of the terminal device (the sound channel) simpler.

Figure 15:
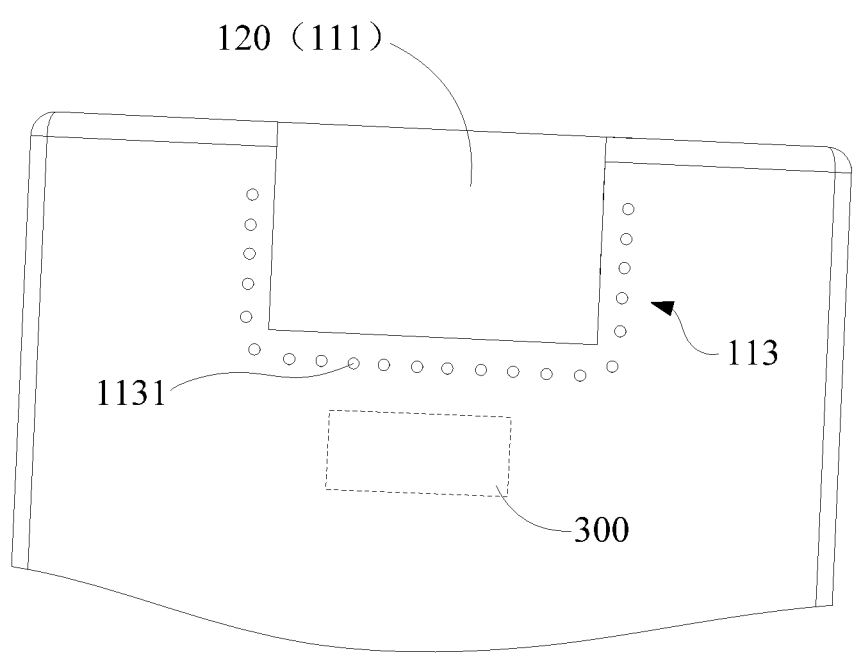
FIG. 15 is a partial view illustrating a rear side of the terminal device according to some embodiments of the present disclosure.

As shown in FIG. 15, FIG. 15 is a partial view illustrating a rear side of the terminal device according to some embodiments of the present disclosure. In some embodiments, as shown in FIG. 15, the sound hole 113 may include a plurality of sub-sound holes 1131. The plurality of sub-sound holes 1131 may be uniformly disposed around sides of the receiving groove 111. At least parts of the plurality of sub-sound holes 1131 may be located between the receiving groove 111 and the speaker unit 300. In some embodiments, the plurality of sub-sound holes 1131 of the sound hole 113 may be uniformly or evenly arranged around three sides of the receiving groove 111. The speaker unit 300 may be disposed adjacent to the receiving groove 111. Parts of the sub-sound holes 1131 may be disposed between the receiving groove 111 and the speaker unit 300.

In addition, the structure of the sound channel may be similar to that in the previous embodiments, that is, a sound channel structure may be separately arranged. The sound channel may be connected to the speaker unit 300 and further connected or communicate the plurality of sub-sound holes 1131 of the sound hole 113 in series. Similarly, a section of the sound channel between the plurality of sub-sound holes 1131 of the sound hole 113 may extend toward a sound output side (along the X direction as shown in FIG. 14), to facilitate the sound from being transmitting out of the receiving groove 111. Of course, in some embodiments, the sound hole 113 and the receiving groove 111 may both communicate with the inner cavity of the rear shell of the terminal device (the fixing bracket 110 in the foregoing embodiments). At least a part of the inner cavity of the rear shell of the terminal device may serve as the sound channel of the sound hole 113 and the receiving groove 111, that is, it is possible not to separately design the sound channel, but the inner cavity formed by the rear shell of the terminal device may be utilized as the sound channel, which can make the internal structure of the terminal device (the sound channel) simpler. The detailed features of this part can refer to the specific description in the above embodiments, and will not be detailed here.

In the terminal device according to some embodiments of the present disclosure, by disposing the speaker unit near or adjacent to the receiving groove of the camera module, when the camera module is rotated out of the receiving groove, the receiving groove may be reused as the sound hole of the speaker unit. When the structure of the terminal device is unchanged, the output volume of the speaker unit may be increased, and the sound output effect of the speaker unit may be improved.

Figure 16:
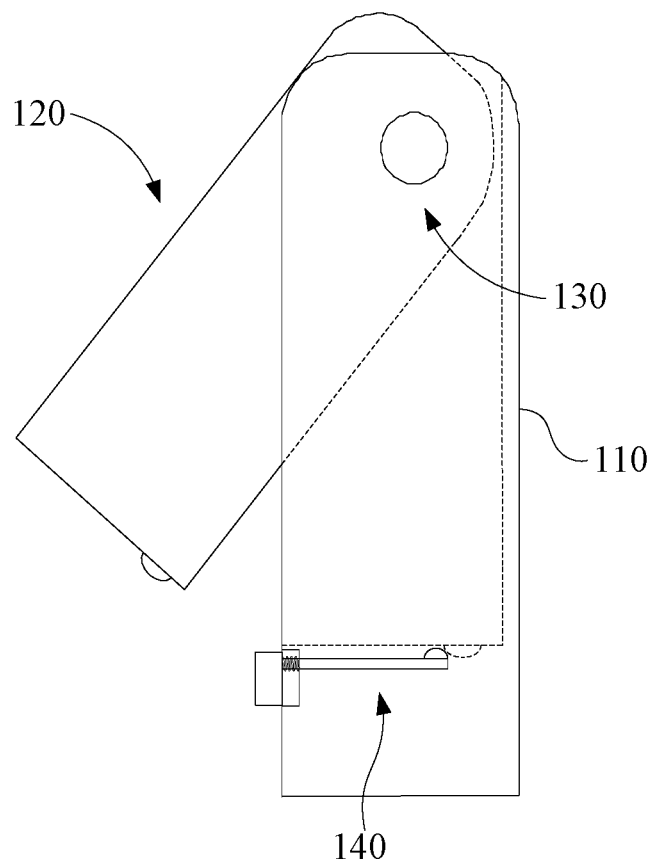
FIG. 16 is a schematic view of a camera assembly according to some embodiments of the present disclosure.

As shown in FIG. 16, FIG. 16 is a schematic view of a camera assembly according to some embodiments of the present disclosure. In some embodiments shown in FIG. 16, the camera assembly may also include a fixing bracket 110, a camera module 120, a driving mechanism 130 and an operating mechanism 140. Different from the camera assembly described in the previous embodiments, the fixing bracket 110 in some embodiments of the present disclosure is not the housing of the terminal device. Instead, the fixing bracket 110 is a separate structural component. In this way, the camera assembly may individually form an assembly. The fixing bracket 110 may be fixedly connected to the housing, a middle frame, or other components of the terminal device. The specific fixed connection between the fixing bracket and the housing or the middle frame of the terminal device and the detailed structural features of the structure of each part of the camera assembly may refer to relevant descriptions in the above embodiments, and will not be repeated here.

Figure 17:
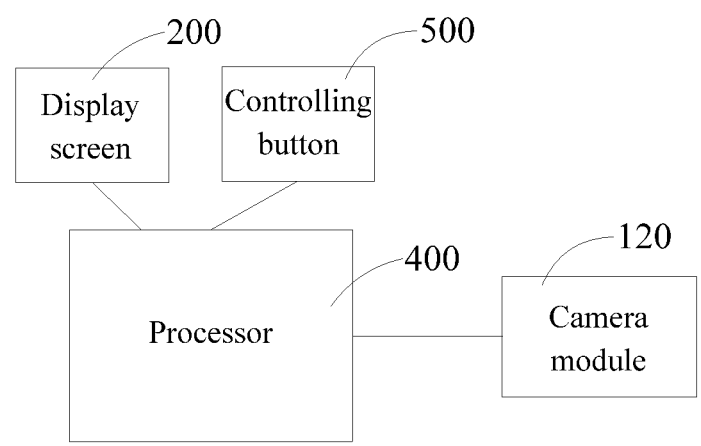
FIG. 17 is block diagram illustrating a partial configuration of the terminal device according to some embodiments of the present disclosure.

As shown in FIG. 17, FIG. 17 is block diagram illustrating a partial configuration of the terminal device according to some embodiments of the present disclosure. In some embodiments, the terminal device may further include a processor 400. In some embodiments, the processor 400 may be electrically connected to the camera module 120. The processor 400 may be configured to control the camera module 120 to perform the photographing. More specifically, the processor 400 may be configured to receive a control instruction, and then control the camera module 120 to turn on, photograph, turn off, and the like. The control instruction received by the processor 400 may be a touch operation received by the display screen 200 (herein, it should be noted that, in some embodiments, the display screen 200 may be a touch display screen). The touch operation may include, but be not limited to, at least one of sliding, clicking, long-pressing, and the like. The specific form of the touch operation may be set according to different types of the terminal devices, user habits, and the like, and will not specifically limited herein.

As further shown in FIGS. 1-3, according to some embodiments of the present embodiment, the terminal device may further include a controlling button 500. The control instruction may include a trigger instruction configured to trigger the controlling button 500. The controlling button 500 may be a single button, or may be reused with other function buttons (such as a power button, a volume button, and the like) of the terminal device. It may be defined that the processor 400 receives different control instructions according to different triggering methods of the buttons.

In some embodiments, the control instruction may include at least one of the following: an image acquisition requirement, a flash activation requirement, and a speaker activation requirement. More specifically, the image acquisition requirement may be applied to scenarios where the user has a shooting requirement (such as photographing, camera shooting, video calling, and the like), a unlocking requirement for the terminal device, a requirement for mobile payment, a requirement for file encryption, a requirement for answering an incoming call, or other confirmation requirements. The flash activation requirement may be a requirement that when the camera module 120 includes a flash, if the user needs to turn on the flash, the processor 400 may control to turn the flash on or off. Similarly, in the case where the camera module 120 includes a speaker (or an earpiece), when the user needs to use the speaker, the corresponding control instruction may be triggered.

For example, take the image acquisition requirement as an example. When the user needs to acquire an image when operating the terminal device (as mentioned above, the image acquisition requirement may specifically include the shooting requirement (photographing, video recording, video calling, and the like), a unlocking requirement for the terminal device, a requirement for mobile payment, a requirement for file encryption, a requirement for answering an incoming call, or other confirmation requirements), it is possible to touch a corresponding touch function area icon on the touch screen, the processor 400 may receive the corresponding control instruction, and then control the camera module 120 to turn on, shoot, turn off, or the like. Thus, the camera may finish an image acquisition action.

The above are only some embodiments of the present disclosure and are not intended to limit the protection scope of the present disclosure. Any equivalent device or equivalent process transformation made according to the description and the drawings of the present disclosure, or directly or indirectly used in other related technical field should be included in the protection scope of the present disclosure.

What is claimed is:

1. A camera assembly for a terminal device, comprising:
a fixing bracket defining an engaging groove;
a camera module, rotatably connected to the fixing bracket and having a reset state in which the camera module is received in the fixing bracket, wherein the camera module comprises a body and an engaging protrusion, wherein the engaging protrusion is disposed at an outer side of the body and is capable of being received in the engaging groove, and wherein when the camera module in the reset state, the engaging protrusion is received in the engaging groove;
a driving mechanism, disposed between the camera module and the fixing bracket and configured to drive the camera module to rotate relative to the fixing bracket to drive the camera module to rotate about a side edge of the camera module, such that an opposite side edge of the camera module is capable of rotating away from the fixing bracket and the camera module is ejected out of the fixing bracket; and
an operating mechanism, arranged on the fixing bracket and configured to control a position of the camera module, wherein the operating mechanism comprises:
an operating key;
an operating link, wherein one end of the operating key protrudes out of an outer surface of the fixing bracket and the other end of the operating key is connected to the operating link, and wherein the operating link is movable relative to the fixing bracket; and
an operating protrusion, disposed on a side surface of an end portion of the operating link, wherein the operating link is capable of abutting against the engaging protrusion through the operating protrusion when the engaging protrusion is received in the engaging groove, such that the engaging protrusion is capable of being released out of the engaging groove and the camera module is driven to rotate and being ejected when driven by the driving mechanism.

2. The camera assembly as claimed in claim 1, wherein the camera module further comprises a body and a camera unit disposed inside the body, and the body is hinged to the fixing bracket through a rotating shaft.

3. The camera assembly as claimed in claim 2, wherein the driving mechanism is a torsion spring, and the torsion spring is sleeved on the rotating shaft, and one end of a torsion force generated by the torsion spring abuts against the body and the other end of the torsion force abuts against the fixing bracket, and the torsion spring is configured to continuously drive the camera module to rotate relative to the fixing bracket.

4. The camera assembly as claimed in claim 2, wherein the fixing bracket defines a receiving groove; and when the camera module is in the reset state, the camera module is completely received in the receiving groove without protruding out of the outer surface of the fixing bracket.

5. The camera assembly as claimed in claim 4, wherein the engaging groove is defined on a side wall adjacent to the receiving groove.

6. The camera assembly as claimed in claim 1, wherein a movement direction of the operating link is substantially perpendicular to a direction of a force applied by the operating link to abut against the engaging protrusion.

7. The camera assembly as claimed in claim 1, wherein the operating link comprises a first connecting rod and a second connecting rod;
wherein one end of the first connecting rod is connected to the operating key, the other end of the first connecting rod is hinged to one end of the second connecting rod, and a middle portion of the second connecting rod is hinged to the fixing bracket via a hinge point; and the second connecting rod is rotatable about the hinge point, and the other end of the second connecting rod is capable of rotating into the engaging groove and further abutting against the engaging protrusion located in the engaging groove.

8. A terminal device, comprising:
a display screen;
a processor; and
a camera assembly, comprising:
a fixing bracket defining an engaging groove;
a camera module, rotatably connected to the fixing bracket and having a reset state in which the camera module is received in the fixing bracket and an ejecting state in which the camera module is located out of the fixing bracket, wherein the camera module comprises a body and an engaging protrusion, wherein the engaging protrusion is disposed at an outer side of the body and is capable of being received in the engaging groove, and wherein when the camera module in the reset state, the engaging protrusion is received in the engaging groove;
a driving mechanism, disposed between the camera module and the fixing bracket and configured to drive the camera module to rotate relative to the fixing bracket and further drive the camera module to rotate about a side edge of the camera module, such that an opposite side edge of the camera module is capable of rotating away from or close to the fixing bracket and that the camera module is switchable between the ejecting state and the reset state; and
an operating mechanism, arranged on the fixing bracket and configured to control a position of the camera module, wherein the operating mechanism comprises:
an operating key;
an operating link, wherein one end of the operating key protrudes out of an outer surface of the fixing bracket and the other end of the operating key is connected to the operating link, and wherein the operating link is movable relative to the fixing bracket; and
an operating protrusion, disposed on a side surface of an end portion of the operating link, wherein the operating link is capable of abutting against the engaging protrusion through the operating protrusion when the engaging protrusion is received in the engaging groove, such that the engaging protrusion is capable of being released out of the engaging groove and the camera module is driven to rotate and being ejected when driven by the driving mechanism;
wherein the processor is configured to receive a control instruction of the display screen and control the camera module in the camera assembly to shoot according to the control instruction.

9. The terminal device as claimed in claim 8, wherein the control instruction of the display screen comprises at least one of sliding, clicking, and long-pressing.

10. The terminal device as claimed in claim 9, wherein the terminal device comprises a controlling button, and the control instruction further comprises a trigger instruction of the controlling button.

11. The terminal device as claimed in claim 8, wherein the control instruction comprises at least one of an image acquisition requirement, a flash activation requirement, and a speaker activation requirement.

12. A terminal device, comprising:
a housing defining an engaging groove;
a camera module, rotatably connected to the housing and having a first position in which the camera module is in the housing and a second position in which the camera module is out of the housing, wherein the camera module comprises a body and an engaging protrusion, wherein the engaging protrusion is disposed at an outer side of the body and is capable of being received in the engaging groove, and wherein when the camera module in the reset state, the engaging protrusion is received in the engaging groove;
a driving mechanism, disposed between the camera module and the housing and configured to drive the camera module to rotate relative to the housing and further drive the camera module to rotate about a side edge of the camera module, such that an opposite side edge of the camera module is capable of rotating away from or close to the housing and that the camera module is movable between the first position and the second position; and
an operating mechanism, arranged on the housing and configured to control a position of the camera module, wherein the operating mechanism comprises:
an operating key;
an operating link, wherein one end of the operating key protrudes out of an outer surface of the fixing bracket and the other end of the operating key is connected to the operating link, and wherein the operating link is movable relative to the fixing bracket; and
an operating protrusion disposed on a side surface of an end portion of the operating link, wherein the operating link is capable of abutting against the engaging protrusion through the operating protrusion when the engaging protrusion is received in the engaging groove, such that the engaging protrusion is capable of being released out of the engaging groove and the camera module is driven to rotate and being ejected when driven by the driving mechanism.

13. The terminal device as claimed in claim 12, wherein the housing defines a receiving groove configured to receive the camera module when the camera module in the first position; and
the camera module further comprises a body and a camera unit disposed inside the body, and the body is hinged to the housing through a rotating shaft.

14. The terminal device as claimed in claim 13, wherein the driving mechanism is a torsion spring, and the torsion spring is sleeved on the rotating shaft, and one end of a torsion force generated by the torsion spring abuts against the body and the other end of the torsion force abuts against the housing, and the torsion spring is configured to continuously drive the camera module to rotate relative to the housing.

15. The terminal device as claimed in claim 13, wherein the engaging groove is defined on a side wall adjacent to the receiving groove.

16. The terminal device as claimed in claim 12, wherein a movement direction of the operating link is perpendicular to a direction of a force applied by the operating link to abut against the engaging protrusion.

17. The terminal device as claimed in claim 12, wherein the operating link comprises a first connecting rod and a second connecting rod,
wherein one end of the first connecting rod is connected to the operating key, the other end of the first connecting rod is hinged to one end of the second connecting rod, and a middle portion of the second connecting rod is hinged to the housing via a hinge point; and the second connecting rod is rotatable about the hinge point, and the other end of the second connecting rod rotates into the engaging groove and further abuts against the engaging protrusion located in the engaging groove.

18. The terminal device as claimed in claim 12, wherein the terminal device further comprises a display screen, the display screen has a display region, and a projection of the camera module projected on the display screen is at least partially disposed within the display region when the camera module is in the first position.

\* \* \* \* \*